United States Patent

Morikawa

[15] 3,689,585
[45] Sept. 5, 1972

[54] PRODUCTION OF ISOPRENE OLIGOMERS

[72] Inventor: Hiroyuki Morikawa, Ami-machi, Japan

[73] Assignee: Mitsubishi Petrochemical Company, Limited, Tokyo-to, Japan

[22] Filed: Dec. 14, 1970

[21] Appl. No.: 98,127

[30] Foreign Application Priority Data

Dec. 24, 1969 Japan ..................44/104020

[52] U.S. Cl. .............................................260/677 R
[51] Int. Cl. ..............................................C07c 11/12
[58] Field of Search.......................260/677, 683.15

[56] References Cited

UNITED STATES PATENTS

| | | |
|---|---|---|
| 3,228,917 | 1/1966 | Childers ..................260/84.1 |
| 3,219,716 | 5/1965 | Wittenberg et al. ........260/666 |
| 3,457,319 | 7/1969 | Olechowski et al. .......260/677 |
| 3,372,206 | 3/1968 | Pruett et al. ................260/666 |
| 3,088,985 | 5/1963 | Wilke .......................260/677 |

*Primary Examiner*—Delbert E. Gantz
*Assistant Examiner*—J. M. Nelson
*Attorney*—Robert E. Burns and Emmanuel J. Lobato

[57] ABSTRACT

Isoprene oligomers are selectively produced in high yields by causing isoprene to undergo oligomerization in contact with a catalyst essentially comprising, in combination, a zirconium compound $Zr(OR)_n X_{4-n}$ (e.g., zirconium tributoxy chloride), a phosphorous compound $PR_3'$, $POR_3'$ or $PO(OR')_3$ (e.g., triphenylphosphine), and an aluminum compound $AlR_2''X'$ (e.g., diethylaluminum chloride), in which R, R', and R'' are the same group or different groups selected from alkyl, cycloalkyl, alkenyl, and aryl groups, X and X' are the same or different halogens, and $n$ is 3 or 2.

4 Claims, No Drawings

PRODUCTION OF ISOPRENE OLIGOMERS

BACKGROUND OF THE INVENTION

This invention relates generally to isoprene oligomers and more particularly to a new and advanced process for selectively producing chain oligomers of isoprene.

It is well known that butadiene is selectively dimerized by a transition metal complex of a metal such as cobalt, iron, and nickel. In the case of isoprene, however, the selectivity and yield of the oligomer are low, wherefore an effective method for dimerization has not yet been developed.

SUMMARY OF THE INVENTION

It is an object of the present invention to provide a simple process for producing useful chain oligomers of isoprene with high selectivity and yield. I have found that the foregoing object can be achieved through the use of combinations of specific zirconium complex catalysts and specific electron-donor compounds.

According to the present invention, briefly summarized, there is provided a process for selectively producing chain oligomers of isoprene in which isoprene is caused to undergo oligomerization by contacting a catalyst comprising, basically, a combination of a zirconium compound representable by a general formula (I), a phosphorous compound representable by a general formula (II), and an aluminum compound representable by a general formula (III), these general formulas being set forth and described hereinafter.

The nature, details, and utility of the invention will be more clearly apparent from the following detailed description beginning with a general aspects and features of the invention and concluding with specific examples of practice illustrating preferred embodiments of the invention.

DETAILED DESCRIPTION

The aforementioned three basic components of the catalyst of the invention and their respective formulas are as follows.

A zirconium compound representable by the general formula (I), $Zr(OR)_nX_{4-n}$, wherein: R is an alkyl group, a cycloalkyl group, an alkenyl group, or an aryl group; X is a halogen; and $n$ is 3 or 2.

A phosphorous compound representable by the general formula (II), $PR'_3$, $POR'_3$, or $PO(OR')_3$, wherein R' is an alkyl group, a cycloalkyl group, an alkenyl group, or an aryl group which is the same as or different from the above defined group R.

An aluminum compound representable by the general formula (III), $AlR_2''X'$, wherein X' a halogen which is the same as or different from that of the above defined group X, and R'' is an alkyl group, a cycloalkyl group, an alkenyl group, or an aryl group which is the same as or different from the above defined groups of R and R'.

I have found that complex catalysts comprizing a specific zirconium compound, that is, a zirconium compound having a mixed ligand of an alkoxy group and a halogen, are selective in forming oligomers in an oligomerization reaction of isoprene. Accordingly, the present invention, which is based on and utilizes this discovery, affords selective production of chain dimers and trimers of isoprene, which production has heretofore been difficult.

The first component of the catalyst for use in accordance with this invention is a zirconium compound representable by the afore-defined general formula (I). Typically representative examples of R groups are alkyl groups (particularly lower alkyl groups) and aryl groups (particularly a phenyl group) having a carbon number (or number of carbon atoms) of the order of from one to 10. Representative examples of halogens are chlorine and bromine, and $n$ is 3 or 2 as stated hereinbefore. Specific examples of zirconium compounds are as follows.

zirconium trimethoxy chloride
zirconium triethoxy chloride
zirconium triisopropoxy chloride
zirconium tributoxy chloride
zirconium triphenoxy chloride
zirconium tributoxy bromide
zirconium diethoxy dichloride
zirconium dipropoxy dichloride
zirconium dibutoxy dichloride
zirconium dibutoxy dibromide These zirconium compounds can be synthesized in the following manner. A quantity of a tetraalkyl zirconate is heated together with acetyl chloride added thereto for 8 hours at 50° C. in a nitrogen atmosphere in a vessel equipped with a reflux condenser. The mol ratio of the acetyl chloride to the tetraalkyl zirconate is 1 (unity) for producing monochloroalkyl zirconate and 2 for producing dichloroalkyl zirconate. Upon completion of the reaction, the desired chloroalkyl zirconate is obtained by reduced-pressure distillation of the resulting reaction materials. Monobromoalkyl and dibromoalkyl zirconates can be similarly synthesized through the use of acetyl bromide.

The second component of the catalyst according to the invention is a phosphorus compound representable by the aforedefined general formula (II). Typically representative examples of this phosphorus compound are those in which R' is an alkyl group (particularly a lower alkyl group) and an aryl group (particularly a phenyl group and a tolyl group) of a carbon number of the order of from one to 10. Specific examples of these phosphorus compounds are as follows.

1. $PR'_3$ type compounds:
trimethylphosphine
triethylphosphine
tripropylphosphine
tributylphosphine
triphenylphosphine
tricresylphosphine 2. $POR'_3$ type compounds:
triethylphosphine oxide
tributylphosphine oxide
triphenylphosphine oxide
tricresylphosphine oxide 3. $PO(OR')_3$ type compounds:
trimethyl phosphate ester
triethyl phosphate ester
tributyl phosphate ester
triphenyl phosphate ester The third component of the catalyst is an aluminum compound representable by the aforedefined general formula (III). Typically representative examples of this compound are those in which R'' is an alkyl group (particularly a lower alkyl group) and an aryl group (particularly a phenyl group) of a carbon number of the order of from one to 10, and the halogen radical is chlorine and bromine. Specific examples of these aluminum compounds are as follows.

dimethylaluminum chloride
diethylaluminum chloride
dipropylaluminum chloride
diphenylaluminum chloride
dicyclohexylaluminum chloride A catalyst according to this invention is formed by mixing the above described three basic and essential components, each of which may be a mixture of two or more compounds. While these components can be mixed together simultaneously or in staggered sequence, I have found that, in general, a desirable procedure is to cause the zirconium compound and the phosphorus compound to contact each other first and then to add thereto the aluminum compound.

The mixing step, in accordance with ordinary practice in the preparation of catalysts of the instant class, is carried out with the process materials in a state wherein active impurities such as those which become catalyst poisons are absent. For example, the mixing step may be carried out in an atmosphere of an inert gas and in a hydrocarbon solvent.

I have found that the following quantitative proportions of these three essential components are suitable. In general, the mol ratio of the phosphorus compound to the zirconium compounds is in the range of from 1:1 to 5:1, particularly from 2:1 to 3:1, while the mol ratio of the aluminum compound to the zirconium compound is in the range of from 3:1 to 20:1, particularly from 5:1 to 10:1.

Except for the unique nature of the catalyst as described above, the production of isoprene oligomers according to this invention may be carried out by any suitable mode of practice which can be applied to an oligomerization reaction of the instant kind.

Accordingly, the reaction can be carried out by causing isoprene to contact a catalyst as described above in the presence of a suitable solvent as, for example, a hydrocarbon such as benzene, toluene, xylene, hexane, and heptane ( a solventless reaction also being possible), at a temperature of the order of from 50° to 130° C., particularly from 70° to 100° C, and under a pressure from atmospheric pressure to pressure thereabove.

The isoprene to be used may contain a small quantity of other 1,3-dienes.

Upon completion of the reaction, the solvent used therein is removed, and fractional distillation is carried out, whereupon the objective dimers and some trimers are recovered.

The dimers and trimers of isoprene are of the following forms.

Dimers: 2,6-dimethyl-1,3,6-octatriene

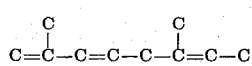

3,6-dimethyl-1,3,6-octatriene

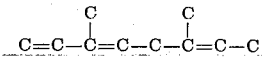

Trimers:
3,6,10-trimethyl-2,5,7,10-dodecatetraene

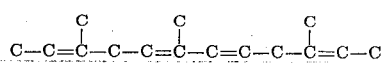

2,6,10-trimethyl-1,3,6,10-dodecatetraene

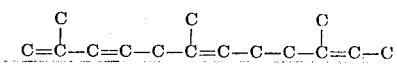

2,9-dimethyl-5-isopropenyl-1,3,8-decatriene

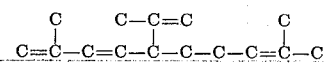

Isoprene dimers are important starting materials for organic synthesis processes. Particularly chain dimers, which are the principal products formed, have a monoterpene skeleton, and the alcohol and aldehyde derivatives thereof can be utilized as terpenic synthetic perfumes.

In order to indicate more fully the nature and utility of this invention, the following examples of practice constituting preferred embodiments of the invention and results are set forth, it being understood that these examples are presented as illustrative only, and that they are not intended to limit the scope of the invention.

EXAMPLE 1

A pressure reaction tube of 150-cc. capacity is flushed (purged) with nitrogen and charged with 30 cc. of benzene, 0.5 millimol of zirconium tributoxy chloride, and 1 millimol of triphenylphosphine, which are agitated. Next, 3 millimols of diethylaluminum chloride and 15 g. (grams) of isoprene are added to the process batch.

The resulting mixture is agitated for 8 hours at 80° C. A methanol-hydrochloric acid solution is thereafter added to the process batch to decompose the catalyst, and the solvent is condensed. Distillation under reduced pressure is then carried out, whereupon 12.9 g. of an oligomer fraction (35° to 150 °C/5mm.Hg) is obtained (86-percent yield).

Composition of oligomer fraction

Dimers:
2,6-dimethyl-1,3,6-octatriene, 70%
3,6-dimethyl-1,3,6-octatriene, 8%
Chain trimer mixture, 22%

EXAMPLE 2

A procedure generally according to that set forth in Example 1 is carried out with the use of 30 cc. of benzene, 0.5 millimol of zirconium triisopropoxy chloride, 2 millimols of tricresylphosphine, 4 millimols of diethylaluminum chloride, and 15 g. of isoprene.

As a result, 13.2 g. of an oligomer fraction is obtained ( 88-percent yield).

Composition of the oligomer fraction

Dimers:
2,6-dimethyl-1,3,6-octatriene, 72%

| | |
|---|---|
| 3,6-dimethyl-1,3,6-octatriene, | 7% |
| Chain trimer mixture, | 21% |

EXAMPLE 3

A procedure generally in accordance with that specified in Example 1 is carried out at a reaction temperature of 100° C with the use of 30 cc. of toluene, 0.5 millimol of zirconium triphenoxy chloride, 1 millimol of tributylphosphine, 6 millimols of diphenylaluminum chloride, and 15 g. of isoprene.

As a result, 12.2 g. of an oligomer fraction is obtained (81-percent yield).

Composition of the oligomer fraction

Dimers:
| | |
|---|---|
| 2,6-dimethyl-1,3,6-octatriene, | 75% |
| 3,6-diemthyl-1,3,6-octatriene, | 7% |
| Chain trimer mixture | 18% |

EXAMPLE 4.

A procedure generally according to that set forth in Example 1 is carried out at a reaction temperature of 110° C. with the use of 30 cc. of xylene, 0.5 millimol of zirconium dibutoxy dichloride, 1 millimol of triphenylphosphine oxide, 4 millimols of diethyl-aluminum chloride, and 15 g. of isoprene.

As a result, 11.9 g. of an oligomer fraction is obtained (79-percent yield).

Composition of the oligomer fraction

Dimers:
| | |
|---|---|
| 2,6-dimethyl-1,3,6-octatriene, | 72% |
| 3,6-dimethyl-1,2,6-octatriene, | 13% |
| Chain trimer mixture, | 15% |

EXAMPLE 5.

A procedure generally in a accordance with that of Example 1 is carried out with the use of 30 cc. of benzene, 0.5 millimol of zirconium diethoxy dichloride, 1.5 millimols of triphenylphosphine, 5 millimols of diisobutylaluminum chloride, and 15 g. of isoprene.

As a result, 12.5 g. of an oligomer fraction is obtained (83-percent yield).

Composition of the oligomer fraction

Dimers:
| | |
|---|---|
| 2,6-dimethyl-1,3,6-octatriene, | 73% |
| 3,6-dimethyl-1,3,6-octatriene, | 18% |
| Chain trimer mixture, | 11% |

EXAMPLE 6

A process generally according to Example 1 is carried out with the use of 30 cc. of toluene, 0.5 millimol of zirconium tributoxy bromide, 1.5 millimols of triphenyl phosphate ester, 8 millimols of diethylaluminum bromide, and 15 g. of isoprene at a reaction temperature of 100° C.

As a result, 9.6 g. of an oligomer fraction is obtained (64-percent yield).

Composition of the oligomer fraction

Dimers:
| | |
|---|---|
| 2,6-dimethyl-1,3,6-octatriene, | 71% |
| 3,6-dimethyl-1,3,6-octatriene, | 8% |
| Chain trimer mixture, | 21% |

EXAMPLE 7

A process generally in accordance with Example 1 is carried out at a reaction temperature of 100° C. with the use of 30 cc. of toluene, 0.5 millimol of zirconium dibutoxy dibromide, 1 millimol of triphenylphosphine, 5 millimols of diethylaluminum chloride, and 15 g. of isoprene.

As a result 10.1 g. of an oligomer fraction is obtained (67-percent yield).

Composition of the oligomer fraction

Dimers:
| | |
|---|---|
| 2,6-dimethyl-1,3,6-octatriene, | 70% |
| 3,6-dimethyl-1,3,6-octatriene, | 11% |
| Chain trimer mixture, | 19% |

COMPARISON EXAMPLE

In order to demonstrate the effectiveness of a zirconium compound having an alkoxy group and a halogen group and constituting a catalyst of this invention, comparison was made with examples in which similar ligands were used, whereupon the results set forth in the following table were obtained.

| Zirconium compound | Oligomer yield (%) | Chain dimer selectivity (%) | |
|---|---|---|---|
| | | 2,6-dimethyl octatriene | 3,6-dimethyl octatriene |
| $Zr(OBu)_4$ | 47 | 63 | 5 |
| $ZrCl_4$ | 5 | 45 | 12 |
| $Zr(OBu)_3Cl$ (Example 1) | 86 | 70 | 8 |

The reaction conditions for this comparison were: a ratio of $PPh_3/Zr$ of 2, a ratio of $Al/Zr$ of 6, a reaction temperature of 80° C., a reaction time of 6 hours, and the use of benzene as a solvent.

From the above results of comparison, it is apparent that the zirconium compound catalyst according to this invention is highly effective in elevating the oligomer yield and selectivity in the production of isoprene oligomers.

I claim:

1. A process for producing isoprene oligomers which comprises causing isoprene to undergo oligomerization at a temperature of about 50° to 130° C. under at least atmospheric pressure in contact with a catalyst comprising, in combination:

I. at least one zirconium compound of the formula $Zr(OR)_n X_{4-n}$, where R is a member selected from the group consisting of alkyl, cycloalkyl, alkenyl, and aryl groups, X is a halogen, and $n$ is an integer greater than one and less than four, II. at least one phosphorus compound selected from the group consisting of compounds of the formulas $PR'_3$, $POR'_3$ and $PO(OR')_3$, where R is a member selected from the group consisting of alkyl, cycloalkyl, alkenyl, and aryl groups which may be the same as or different from R, and III. at least one aluminum compound of the formula $AlR_2''X'$, where $X'$ is a member selected from the group consisting of halogens which may be the same as or different from X, and $R''$ is a member selected from the group consisting of alkyl, cycloalkyl, alkenyl, and aryl groups which may be the same as or different from R and R'.

2. A process for producing isoprene oligomers according to claim 1 in which the quantitative proportions of the zirconium, phosphorus, and aluminum compounds are such that the mol ratio of the phosphorus compound to the zirconium compound is from 1:1 to 5:1, and the mol ratio of the aluminum compound to the zirconium compound is from 3:1 to 2:1.

3. A process for producing isoprene oligomers according to claim 1 in which said zirconium compound (I) is selected from the group consisting of zirconium trialkoxy chloride, zirconium dialkoxy dichloride, zirconium trialkoxy bromide, and zirconium dialkoxy dibromide wherein each of said alkoxy groups contains one to 10 carbon atoms, said phosphorus compound is selected from the group consisting of triphenyl phosphine, tricresyl phosphine, and trialkyl phosphine wherein the alkyl groups contain one to 10 carbon atoms, and said aluminum compound is selected from the group consisting of dialkylaluminum chloride, dialkylaluminum bromide, wherein each of said alkyl groups contains one to 10 carbon atoms and diphenylaluminum chloride.

4. A process for producing isoprene oligomers according to claim 1 in which said zirconium compound is selected from zirconium trialkoxy halide in which each alkoxy group contains one to 10 carbon atoms, said phosphorus compound is triphenyl phosphate, and said aluminum compound is selected from dialkylaluminum halide in which each alkyl groups contain one to 10 carbon atoms.

* * * * *